United States Patent

Stickel, III

[11] Patent Number: 5,121,909
[45] Date of Patent: Jun. 16, 1992

[54] BARBECUE TRAY

[75] Inventor: J. Frederick Stickel, III, Buffalo Grove, Ill.

[73] Assignee: Teledyne Industries, Inc., Los Angeles, Calif.

[21] Appl. No.: 610,744

[22] Filed: Nov. 8, 1990

[51] Int. Cl.⁵ .............................................. B23Q 3/00
[52] U.S. Cl. .................................................. 269/289 R
[58] Field of Search ..................... 269/289 R, 302.1; 108/152; 126/9 B, 25 R

[56] References Cited

U.S. PATENT DOCUMENTS

| | | | |
|---|---|---|---|
| D. 298,406 | 11/1988 | Stephen et al. | |
| 3,381,636 | 5/1968 | Saiberlich | 108/152 |
| 3,654,979 | 4/1972 | Montgomery | 269/289 |
| 3,688,706 | 9/1972 | Merryweather | 108/152 |
| 4,041,964 | 8/1977 | Shamoon | 269/302.1 |
| 4,337,751 | 7/1982 | Sampson et al. | |
| 4,440,385 | 4/1984 | Kingery | 269/289 |
| 4,665,888 | 5/1987 | Christen, Jr. et al. | |
| 4,688,541 | 8/1987 | Stephen et al. | |
| 4,840,361 | 6/1989 | Richter | |
| 4,843,977 | 7/1989 | Bridges | 108/152 |
| 4,907,789 | 3/1990 | Tice | |

Primary Examiner—Robert C. Watson
Attorney, Agent, or Firm—Shoemaker and Mattare, Ltd.

[57] ABSTRACT

A barbeque tray designed to support cooked foods has a peripheral drippings groove leading to a basin at one end of the tray, a handle extending from the opposite end of the tray, and a recessed bottom providing a lip at the end opposite the handle. While the handle is held with one hand, the lip is hooked over the rim of the grill, to stabilize the tray while food is transferred to it. The lip also provides a convenient grip for the other hand when carrying food away from the grill.

1 Claim, 4 Drawing Sheets

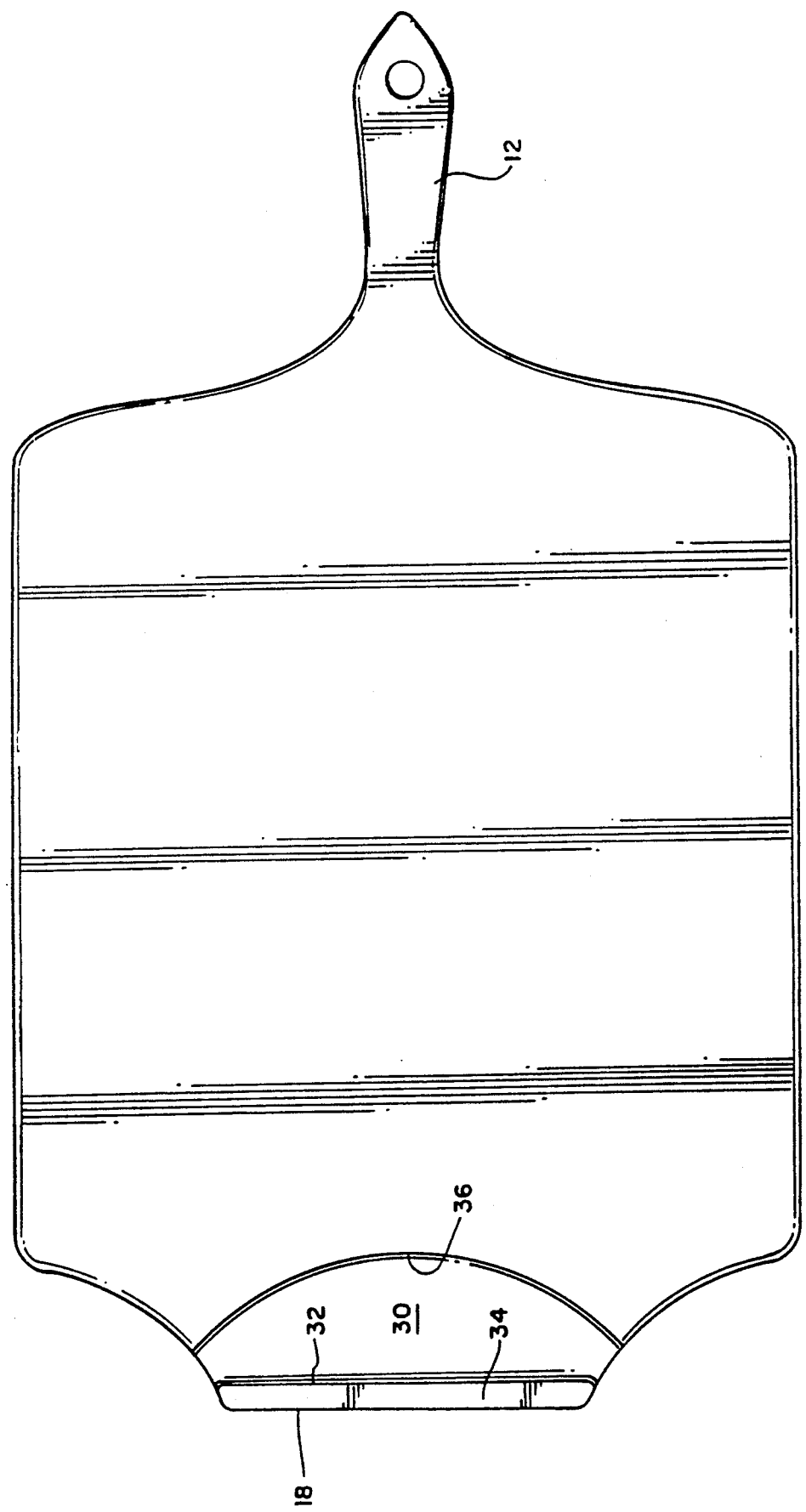

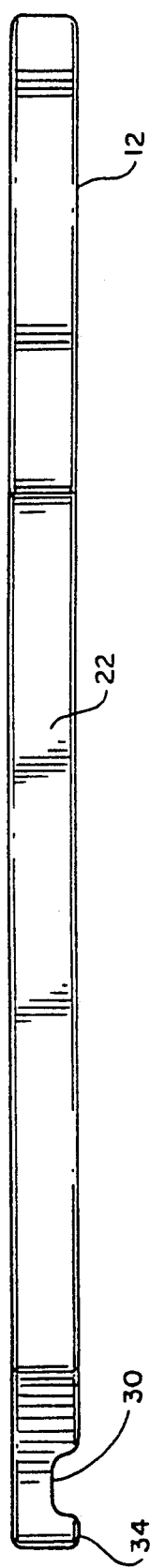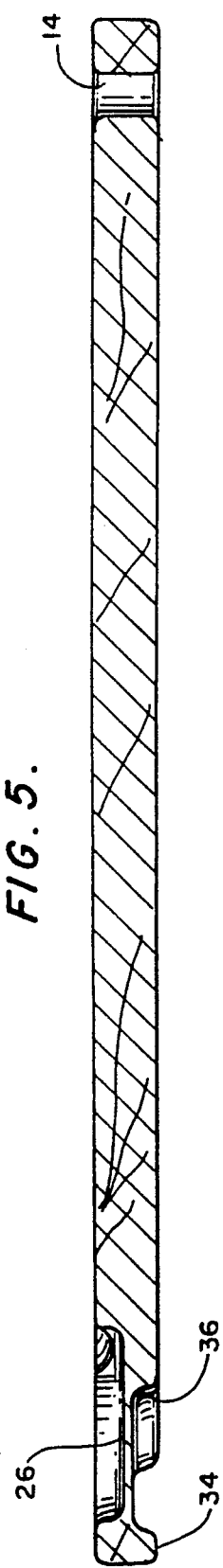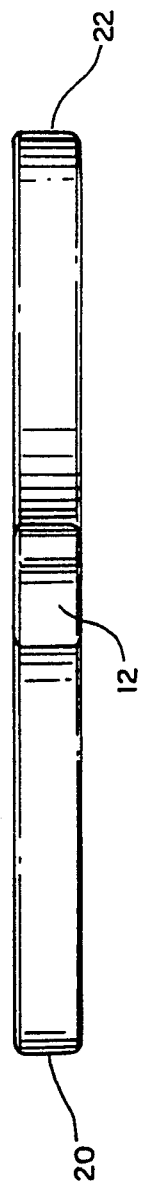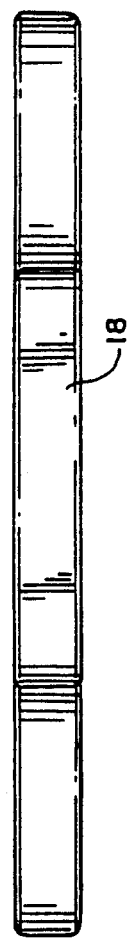

BARBECUE TRAY

BACKGROUND OF THE INVENTION

This invention relates generally to cooking implements, and more particularly to a combination cutting board and serving plank intended especially for use with barbeque grills.

Numerous utility trays of this type are known. Representative examples are found in U.S. Pat. Nos. 4,337,751; 4,688,541; 4,840,361; 4,907,789; 4,665,888; and U.S. Pat. No. Des. 298,406. The trays shown in these patents have means at one end for engaging the rim of a grill, or a fixture thereon; the other end of the tray is supported by a leg or prop. Cutting boards having peripheral grooves for collecting juices and delivering them to a basin or the like are also well known. Two such boards are illustrated in U.S. Pat. Nos. 4,840,789 and 4,907,789.

Ordinarily, a cook transfers barbequed food, such as a roast, from the grill to a tray held in one hand, carries the tray into the house, and then transfers the food to a cutting board. This is unnecessarily wasteful of effort and clean-up time.

Having perceived a need for a combination barbeque tray and cutting board, I have developed a tray or board which combines desirable functions from both such devices in a simple, attractive, easy-to-handle device.

SUMMARY OF THE INVENTION

An object of the invention is to enable one to transfer foods directly from a grill to a cutting board. This is accomplished by providing a cutting board with a breadboard type handle at one end, and a lip on the bottom of the board at the other end for engaging the edge of the grill, so that the board can be steadied with only one hand, while the roast is transferred from the grill with the free hand.

Another object is to facilitate handling heavy foods, such as roasts. The gripping rib of this invention also acts as a second handle or grip, facilitating handling of the tray in such situations.

BRIEF DESCRIPTION OF THE DRAWINGS

In the accompanying drawings:

FIG. 3 is a bottom plan view thereof;

FIG. 4 is a side elevational view thereof;

FIG. 5 is a sectional view taken along the line 5—5 in FIG. 2;

FIG. 6 is a right end view thereof; and

FIG. 7 is a left end view thereof.

DESCRIPTION OF THE PREFERRED EMBODIMENT

Figure 1:
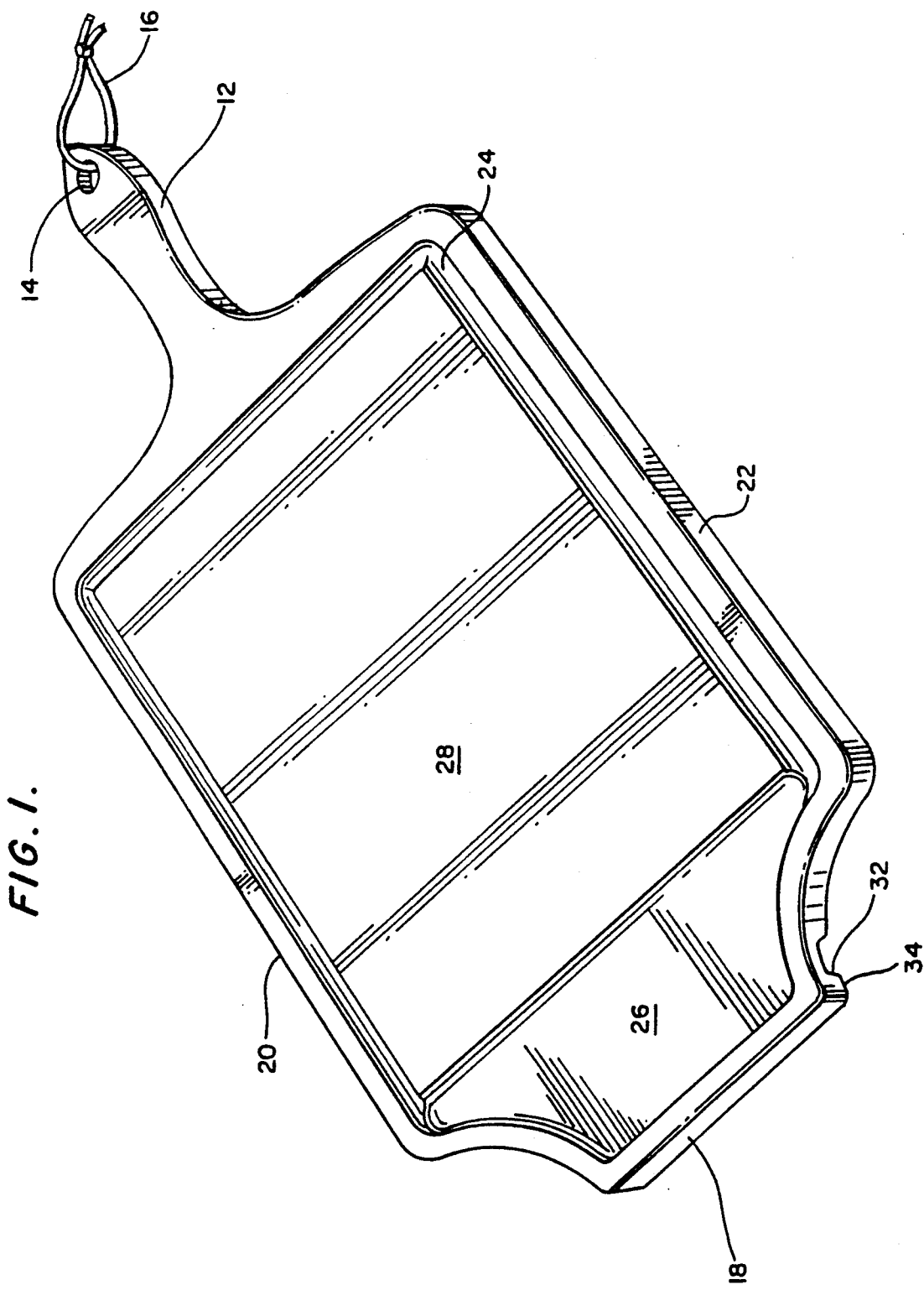
FIG. 1 is a perspective view of a barbeque tray, showing my new design.
Figure 2:
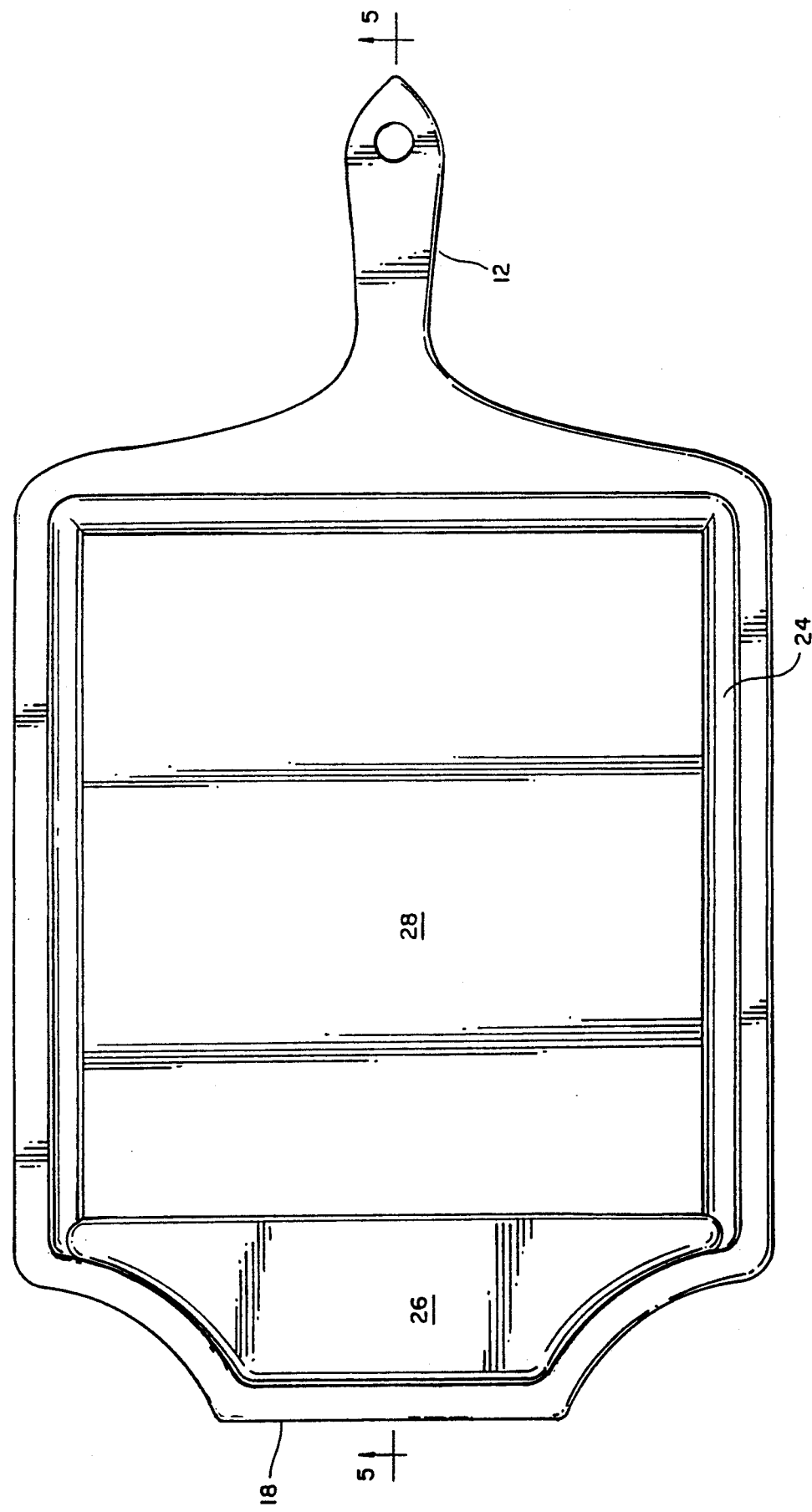
FIG. 2 is a top plan view thereof.

As shown in FIG. 1, a barbeque tray embodying the invention is formed from a single piece of wood stock of uniform thickness, preferably a butcher-block lamination of select hard maple. A protruding handle 12 is formed at one end of the board. The handle has a through hole 14 at its free end, through which a loop of rawhide 16 or the like is fastened to provide a hanger.

At the other end of the board, the corners of the board are cut out, leaving a broad straight edge 18 extending perpendicular to each of the parallel sides 20, 22 of the board. The area between the handle 12, the edge 18, and the sides 20 and 22 is substantially rectangular in plan, except that all corners and edges are generously rounded. A groove 24, extending around three sides of the board, and a drippings basin 26 adjacent the edge 18, define a large rectagular cutting area 28 at the center of the board. The groove is of uniform depth, while the basin is somewhat deeper, as best seen in FIG. 1.

The bottom surface of the board is provided with a recess 30, extending between the cut out areas. The recess has a first side 32 which extends parallel to the edge 18, about three-eighths of an inch therefrom, defining a lip 34, and a curved second side 36 which is concave with respect to the first side. The radius of curvature of the second side approximates that of a standard round barbeque cooker.

In use, the cook may rest the edge 18 of the board temporarily over the edge of the grill. The board cannot slip off accidentally, because of the interaction between lip 34 and the grill rim. The great breadth of the recess stabilizes the board against tipping (around the axis of the handle). Thus, the board can be safely supported with one hand on the handle, so that one hand remains free for transfering meat from the grill to the tray. Subsequently, if necessary, the cook can grasp the lip 34 with his free hand to steady the board as he carries it.

Inasmuch as the invention is subject to variation, modifications, and changes in detail, it is intended that the foregoing description, and the accompanying drawings, shall be interpreted as only illustrative of the invention described by the following claims.

I claim:

1. A barbeque tray comprising a unitary body having parallel top and bottom surfaces and two parallel sides interconnecting said surfaces, a narrow, protruding handle at one end of the body, and a substantially thicker, short handle at the other end of the body, a peripheral groove extending around three sides of the body, and a drippings basing interconnecting the ends of said groove, said groove and basin defining between them a rectangular cutting area, and a recess in the bottom surface of said body, beneath the basin, said recess extending parallel to the end of the body, and defining a lip for engaging the rim of a barbeque grill, wherein said recess has a first side extending parallel to the end of the body, and forming said lip, and a second side which is concave with respect to the first side.

* * * * *